US010217155B2

(12) United States Patent
Jung

(10) Patent No.: US 10,217,155 B2
(45) Date of Patent: Feb. 26, 2019

(54) PRODUCT CROSS-SELLING METHOD AND SYSTEM

(71) Applicant: GOODSFLOW CO., LTD., Seoul (KR)

(72) Inventor: Tae Jin Jung, Seoul (KR)

(73) Assignee: GOODS FLOW CO., LTD., Seoul (KR)

( * ) Notice: Subject to any disclaimer, the term of this patent is extended or adjusted under 35 U.S.C. 154(b) by 531 days.

(21) Appl. No.: 14/907,290

(22) PCT Filed: Dec. 1, 2014

(86) PCT No.: PCT/KR2014/011650
§ 371 (c)(1),
(2) Date: Jan. 25, 2016

(87) PCT Pub. No.: WO2015/119365
PCT Pub. Date: Aug. 13, 2015

(65) Prior Publication Data
US 2016/0171586 A1 Jun. 16, 2016

(30) Foreign Application Priority Data

Feb. 7, 2014 (KR) .................. 10-2014-0014304

(51) Int. Cl.
*G06Q 30/06* (2012.01)
*G06Q 10/08* (2012.01)
(Continued)

(52) U.S. Cl.
CPC ....... *G06Q 30/0627* (2013.01); *G06Q 10/087* (2013.01); *G06Q 10/0833* (2013.01);
(Continued)

(58) Field of Classification Search
None
See application file for complete search history.

(56) References Cited

U.S. PATENT DOCUMENTS 7,363,249 B1 *  4/2008 Boesjes ............... G06Q 10/087
                                                  705/26.81
8,489,436 B1 *  7/2013 Panzitta ............. G06Q 10/087
                                                  705/7.38
(Continued)

FOREIGN PATENT DOCUMENTS

KR   10-2006-0006752 A    1/2006
KR   10-2006-0068368 A    6/2006
(Continued)

OTHER PUBLICATIONS

International Search Report for PCT/KR2014/011650 dated Feb. 5, 2015 from Korean Intellectual Property Office.

*Primary Examiner* — Nicholas D Rosen
(74) *Attorney, Agent, or Firm* — Revolution IP, PLLC

(57) ABSTRACT

Disclosed herein is a product cross-selling method and system for providing first product information provided by a product provider to a retailer, respectively providing a product cost and a sales commission to the first product provider and the retailer when a first product mapped to the first product information is sold via the retailer, providing second product information provided by the retailer to the first product provider and respectively providing product cost and sales commission to the retailer and the first product provider when a second product mapped to the second product information is sold via the first product provider.

7 Claims, 2 Drawing Sheets

(51) Int. Cl.
  *G06Q 20/10* (2012.01)
  *G06Q 20/12* (2012.01)
(52) U.S. Cl.
  CPC ............ *G06Q 20/10* (2013.01); *G06Q 20/12* (2013.01); *G06Q 30/06* (2013.01); *G06Q 30/0601* (2013.01); *G06Q 30/0631* (2013.01); *G06Q 30/0635* (2013.01)

(56) References Cited

U.S. PATENT DOCUMENTS

| | | | | |
|---|---|---|---|---|
| 8,527,367 B2* | 9/2013 | Blank | ................ | G06Q 30/0633 705/26.8 |
| 2006/0195563 A1* | 8/2006 | Chapin | ................ | G06Q 10/087 709/223 |
| 2007/0299743 A1* | 12/2007 | Staib | .................... | G06Q 10/107 705/7.33 |
| 2009/0106108 A1* | 4/2009 | Ku | ......................... | G06Q 30/02 705/14.54 |
| 2009/0125422 A1* | 5/2009 | Ettlinger | ................ | G06Q 30/06 705/26.1 |
| 2012/0116922 A1 | 5/2012 | Ku | | |
| 2012/0191565 A1* | 7/2012 | Blank | ................ | G06Q 30/0633 705/26.8 |
| 2013/0173421 A1* | 7/2013 | Bandara | ................. | G06Q 20/12 705/26.8 |
| 2014/0214615 A1* | 7/2014 | Greystoke | .......... | G06Q 30/0631 705/26.44 |

FOREIGN PATENT DOCUMENTS

| | | |
|---|---|---|
| KR | 10-2009-0016101 A | 2/2009 |
| KR | 10-2010-0046738 A | 5/2010 |
| KR | 10-2010-0083258 A | 7/2010 |
| KR | 10-1165419 B1 | 8/2012 |
| WO | WO-02/03243 A1 * | 1/2002 |
| WO | WO-2005/052833 A1 * | 6/2005 |
| WO | WO 2011/139643 A1 * | 11/2011 |

\* cited by examiner

PRODUCT CROSS-SELLING METHOD AND SYSTEM

CROSS REFERENCE TO PRIOR APPLICATIONS

This application is a National Stage Application of PCT International Patent Application No. PCT/KR2014/011650 filed on Dec. 1, 2014, under 35 U.S.C. § 371, which claims priority to Korean Patent Application No. 10-2014-0014304 filed on Feb. 7, 2014, which are all hereby incorporated by reference in their entirety.

TECHNICAL FIELD

The present invention relates to a method of selling products, and more particularly, to a product cross-selling method for enabling each of a plurality of product providers to smoothly sell, deliver and pay for products of the other product providers.

BACKGROUND ART

With development of information and communication technology, an online product sale rate has continually increased.

For online product sale, product providers and product sellers have provided various product sale methods.

In particular, recently, methods of selling products using a product cross-selling method disclosed in Korean Patent application NOs. 10-2009-0002554 and 10-2014-0107031 have been proposed.

Using the product cross-selling method, the product sellers sell products which are not directly provided thereby, thereby creating profit.

However, the conventional product cross-selling method provides a sale agency system using a homepage or increases online product exposure only.

Accordingly, in the conventional product cross-selling method, each of a plurality of product providers cannot freely sell products provided by the other product providers.

DISCLOSURE

Technical Problem

An object of the present invention is to provide a product cross-selling method and system for enabling each of a plurality of product providers to smoothly sell, deliver and pay for products of the other product providers and, more particularly, to a product cross-selling method and system for providing first product information provided by a first product provider to a retailer, respectively providing a product cost and a sales commission for a product to the first product provider and the retailer when a first product mapped to the first product information is sold via the retailer, providing second product information provided by the retailer to the first product provider, and respectively providing a product cost and a sales commission to the retailer (the second product provider) and the first product provider (the retailer for the second product) when a second product mapped to the second product information is sold via the first product provider (in this case, the retailer becomes the second product provider and the first product provider becomes the retailer for the second product).

Technical Solution

The object of the present invention can be achieved by providing a product cross-selling method including an open garden server receiving and storing product information mapped to products from a plurality of product provider terminals; each of the plurality of product provider terminals becoming a retailer terminal for cross-selling products of the other product providers and, when a request for downloading product information provided by another product provider is received from any one of the plurality of product provider terminals, the open garden server downloading the product information to a retailer terminal which has requested the product information or a shopping mall server, with which a retailer who is a user of the retailer terminal is registered as a seller; transmitting a stock change condition of the product according to sale of the product to the retailer terminal or the shopping mall server, which has downloaded the product information, to control the number of products in stock; and, when a consumer requests purchase of the product of another product provider in the retailer terminal or the shopping mall server, the retailer terminal providing purchase information of the product to the open garden server and, at the same time, making payment and the open garden server, which has received the purchase information, transmitting the purchase information to another product provider terminal such that the product is directly delivered to the consumer by the product provider.

In another aspect of the present invention, there is provided a product cross-selling system including a product provider terminal used by a product provider to provide a product to be sold; a retailer terminal used by a retailer for selling the product; an open garden server configured to manage information about the product, to provide the product information to the retailer terminal, to provide a stock condition of the product, to provide an invoice output function according to sale of the product, to provide real-time delivery information of the product based on an invoice number, to provide a service for recommending a cross-matching product, to provide a service for searching for a cross-matching product, to provide sales ranking data of the products and to provide some of a sales cost of the product to the product provider when the product is sold by the retailer; and a shopping mall server configured to sell the product registered by the retailer to consumers.

Advantageous Effects

According to the present invention, each of a plurality of product providers can freely and efficiently sell products of the other product providers, thereby creating profit.

BEST MODE

Hereinafter, embodiments of the present invention will be described in detail with reference to the accompanying drawings.

Figure 1:
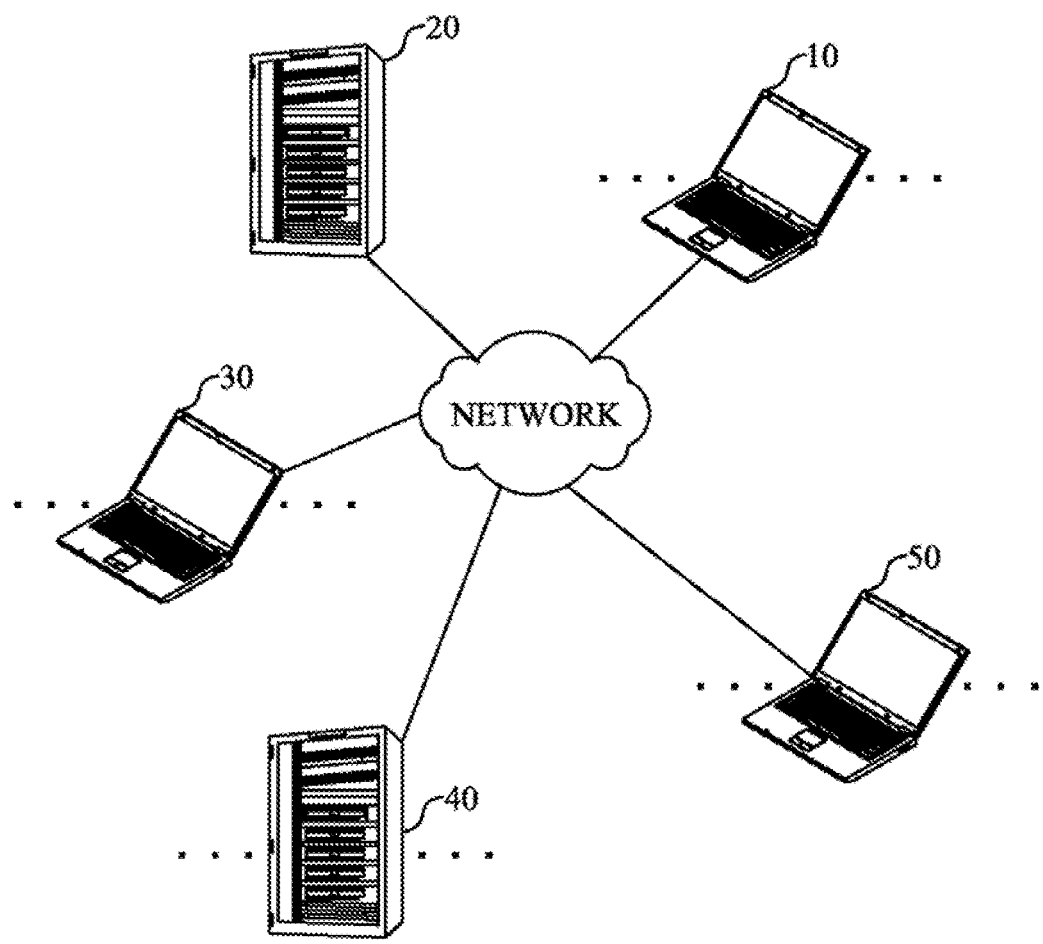
FIG. 1 is a diagram showing an embodiment of a product cross-selling system according to the present invention.
Figure 2:
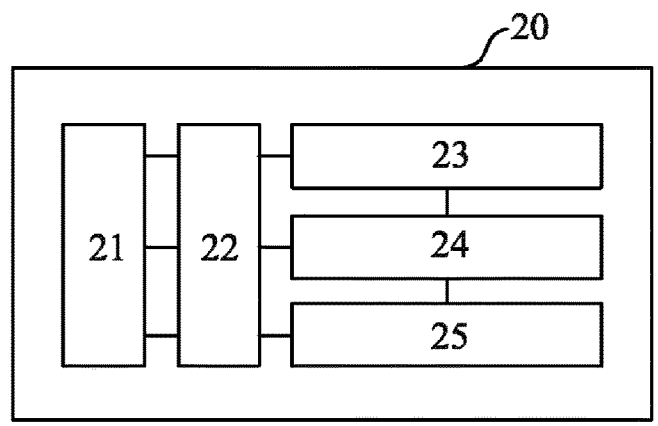
FIG. 2 is a diagram showing an embodiment of an open garden server, to which the product cross-selling method according to the present invention is applied.

FIG. 1 is a diagram showing an embodiment of a product cross-selling system according to the present invention, and FIG. 2 is a diagram showing an embodiment of an open garden server, to which the product cross-selling method according to the present invention is applied.

The product cross-selling system, to which the product cross-selling method according to the present invention is applied, includes, as shown in FIG. 1, a product provider terminal 10 used by a product provider for providing a product to be sold, a retailer terminal 30 used by a retailer for selling the product, an open garden server 20 for managing information about the product (hereinafter, briefly referred to as "product information"), providing the product information to the retailer terminal 30 and giving some of a sales cost of the product when the product is sold by the retailer, a shopping mall server 40 for selling the product registered by the retailer to a consumer and a consumer terminal 50 used by a consumer who will access the shopping mall server 40 and purchase the product.

The product provider terminal 10, the retailer terminal 30 and the consumer terminal 50 may be various terminals capable of transmitting and receiving information via a wired or wireless network, such as personal computers (PC), laptops, smartphones, tablet PCs, etc. However, the product provider terminal 10 and the retailer terminal 30 may be servers.

The open garden server 20 and the shopping mall server 40 may be general servers which are currently being used.

The open garden server 20 includes, as shown in FIG. 2, an interface 21 for communicating with the product provider terminal 10, the retailer terminal 30 and the shopping mall server 40 via a network, an information manager 23 for managing the product information, information about the product provider, information about the retailer, etc. a product sale unit 24 for performing product sale processes when a product is sold via the retailer, a cost settlement unit 25 for providing, to the product provider, profit according to product sale, and a controller 22 for controlling the functions of the interface 21, the information manager 23, the product sale unit 24 and the cost settlement unit 25.

That is, the open garden server 20 manages information about products registered via the product provider terminal 10, provides the product information to the retailer terminal 30, provides the stock condition of the products, provides an invoice output function according to product sale, provides real-time delivery information of the products based on invoice number, provides a service for recommending a cross-matching product, provides a service for searching for a cross-matching product, provides sales ranking data of the products, and provides some of the sales cost of the products to the product provider and the retailer when the products are sold by the retailer.

Figure 3:
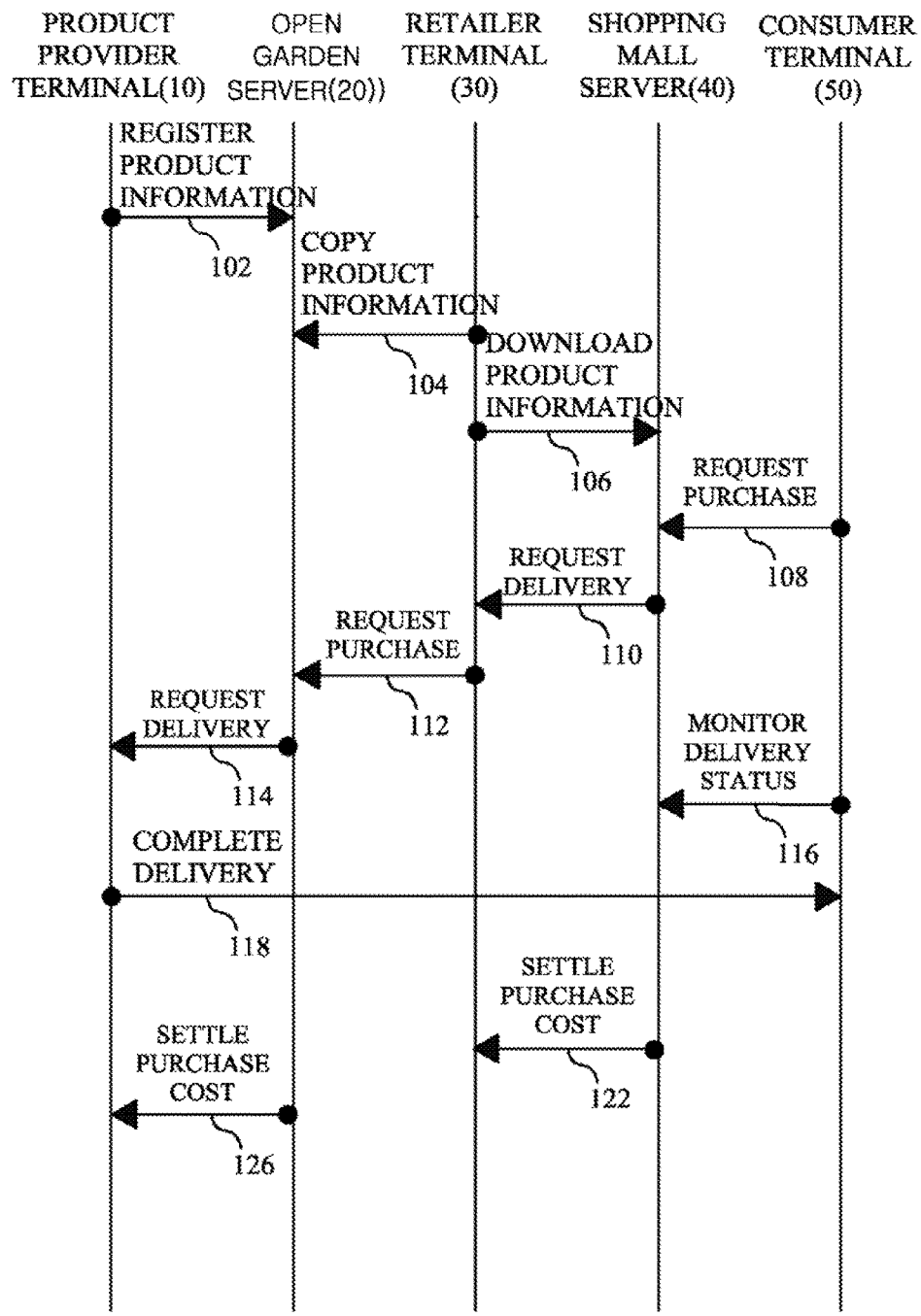
FIG. 3 is a flowchart illustrating a product cross-selling method according to the present invention.

FIG. 3 is a flowchart illustrating a product cross-selling method according to the present invention.

The product cross-selling method according to the present invention can enable product providers using e-commerce to freely cross-sell each other's products.

For example, when one product provider exhibits and provides product information thereof via the open garden server 20, another product provider or product seller (hereinafter, briefly referred to as a "retailer") downloads the product information, registers the product information with an e-commerce site or shopping mall or open market thereof and sells the product on the e-commerce site or shopping mall or open market, thereby creating profit.

That is, when the retailer orders and pays for a product, purchase of which is requested via each site, via the open garden server 20, the open garden server 20 requests delivery of the product from the product provider and the product provider provides the product to a consumer who desires to purchase the product.

According to the present invention, the product provider may increase a sales area of products provided thereby, the retailer may sell products which are not directly provided thereby so as to create profit, and the open garden server 20 may relay information between the product provider and the retailer so as to create new profit.

The product cross-selling method according to the present invention includes step 102 of the open garden server 20 receiving and storing first product information mapped to a first product from the product provider terminal 10; steps 104 and 106 of the open garden server 20 downloading the first product information to the retailer terminal 30 or the first shopping mall server 40 when a request for downloading the first product information is received; step of the open garden server 20 transmitting a stock condition of the first product to the retailer terminal 30; steps 108, 110, 112 and 114 of setting the retailer who is a manager of the retailer terminal as a seller and transmitting a signal for requesting delivery of the first product to the product provider terminal 10, when a request for purchasing the first product is received from the retailer terminal 30 or the first shopping mall server 40; and steps 102 to 114 of the open garden server 20 receiving and storing second product information mapped to a second product from the retailer server 30, transmitting the second product information to the product provider terminal 10, setting the product provider who is a manager of the product provider terminal 10 as a seller and transmitting a signal for requesting delivery of the second product to the retailer terminal 30, when a request for purchasing the second product is received via the product provider terminal 10.

1. First Product Registration Process 102

The product provider who desires to use the product cross-selling method according to the present invention via the open garden server 20 generates the first product information mapped to the first product produced or provided thereby, accesses the open garden server 20 using the product provider terminal 10, and registers the first product information with the open garden server 20. The open garden server 20 stores the first product information and information about the product provider in the information manager 23 (102).

2. First Product Download Process 104 and 106

The retailer who desires to sell the first product using the product cross-selling method according to the present invention transmits sales request information indicating sale of the first product to the open garden server 20 using the retailer terminal 30.

The open garden server 20 stores information about the retailer in the information manager 23.

The retailer copies the first product information via the retailer terminal 30 (104) and then downloads and stores the copied first product information to a terminal which will sell the first product (106).

The terminal may be the retailer terminal 30 or the shopping mall server 40 in which the retailer sells the first product.

For example, the retailer may download the first product information in the shopping mall directly managed thereby from the open garden server and sell the first product in the shopping mall. In this case, when the retailer terminal 30 performs the function of the shopping mall, the terminal in which the first product information is downloaded and stored may be the retailer terminal 30.

In addition, the retailer may upload the first product information to various large shopping malls such as Auction, GMarket, 11st, etc. and sell the first product in the large shopping mall. In this case, the terminal in which the first product information is downloaded and stored may be the large shopping mall. Hereinafter, for convenience of description, the present invention will be described on the assumption that the first product is sold in the large shopping mall. The large shopping mall is referred to as a first shopping mall server 40.

3. First Product Sale Process 108 to 118

When a request for purchasing the first product is received from the retailer terminal 30 or the first shopping mall server 40, the open garden server 20 sets the retailer who is the manager of the retailer terminal 30 as a seller and transmits the signal for requesting delivery of the first product to the product provider terminal 10 (108, 110, 112 and 114).

For example, the consumer accesses the first shopping mall server 40 using the consumer terminal 50 thereof and then requests purchase of the first product from the first shopping mall server 40 (108).

As a first example, the first shopping mall server 40 may transmit the signal for requesting delivery of the first product to the retail terminal 30 upon receiving the request for purchasing the first product (110).

When the delivery request signal is transmitted to the retailer terminal 30, the retailer terminal 30 may automatically transmit the delivery request signal to the open garden server 20 (112). However, when the delivery request signal is transmitted to the retailer terminal 30 (110), the retailer, who has confirmed the delivery request signal, may directly transmit the delivery request signal to the open garden server 20 (112).

As a second example, the first shopping mall server 40 may directly transmit the delivery request signal of the first product to the open garden server 20 upon receiving the request for purchasing the first product.

For example, when the retailer registers the open garden server 20 as a destination of the delivery request signal, the first shopping mall server 40 may directly transmit the delivery request signal of the first product to the open garden server 20. In this case, the delivery request signal of the first product may also be transmitted to the retailer terminal 30.

In the first example and the second example, an invoice of the first product may be generated in the product provider terminal 10 and transmitted to the retailer terminal 30, the open garden server 20 or the first shopping mall server 40 or may be generated in the open garden server 20, which has received the purchase request signal, and transmitted to the first shopping mall server 40.

When the purchase request signal of the first product is received via the retailer terminal 30 or the first shopping mall server 40 (112), the retailer who is the manager of the retailer terminal 30 is set as the seller and the delivery request signal of the first product is transmitted to the product provider terminal 10 (114).

The product provider who has received the delivery request signal sets the seller of the first product as the retailer, sets the producer or provider of the first product as the product provider and delivers the first product to the consumer (118).

In this case, the consumer may monitor the delivery status of the first product via the first shopping mall server 40 (116).

The product provider terminal 10 or the open garden server 20 may transmit delivery information of the first product to the retailer terminal 30 or the first shopping mall server 40.

When the delivery information of the first product is transmitted to the retailer terminal 30, the retailer terminal 30 may transmit the delivery information of the first product to the first shopping mall server 40.

In this case, the product provider terminal may transmit the delivery information of the product to the open garden server 20. The open garden server 20 may transmit the delivery information to the retailer terminal and the consumer terminal, which has requested purchase of the product, may confirm the delivery information in the retailer terminal 30.

Although the first product may be sold by the retailer in the first shopping mall server 40, the first product may be sold online or offline by the product provider for providing the first product.

Accordingly, the open garden server 20 may receive the stock condition of the first product from the product provider terminal 10 and transmit the stock condition of the first product to the retailer terminal 30. In this case, the retailer terminal 30 may transmit the stock condition to the first shopping mall server 40 or the retailer may directly transmit the stock condition to the first shopping mall server 40.

Management of the stock condition will now be described.

First, the stock condition may be managed in two cases. That is, the stock condition may be managed when products in stock are exhausted or when products in stock are estimated to be exhausted.

When products in stock are exhausted, out-of-stock processing may be automatically performed in the associated shopping mall (the shopping mall server 40). For example, when the open garden server 20 transmits out-of-stock information to the shopping mall (the shopping mall server 40), the shopping mall may display the number of products in stock as "0". The shopping mall, that is, the shopping mall server 40, may be a shopping mall such as Auction or GMarket or a shopping mall managed by the retailer.

Even when products in stock are estimated to be exhausted, the open garden server 20 may provide estimated out-of-stock information using the above-described method and indicate that the number of products stock will be zero soon in the shopping mall.

In this case, the stock information associated with the shopping mall 40 may be automatically controlled in association with the open garden server 20.

When products in stock are exhausted or when products in stock are estimated to be exhausted, the open garden server 20 may inform the product provider terminal 10 of out-of-stock in advance (via an account stored in the open garden server 20 or a short messaging service (SMS)), such that the product provider deals with out-of-stock in advance.

That is, when the product provider registers 10 products in stock and then a plurality of retailers brings and sells the products, it may be difficult to confirm the total number of sales or the number of accumulated products. In this case, the open garden server 20 may control the total number of sales of the retailer, thereby solving retailer difficulties due to shortage of products in stock.

That is, when the retailer does not know information about the number of products in stock of the product provider, after a consumer purchases a product that is an out-of-stock, product purchase may be troublesomely cancelled due to shortage of products in stock. Products in stock are continuously exhausted via cross selling. Therefore, in the present invention, the retailer may be informed that the products in stock are exhausted so as to prevent default.

The invoice will now be described in detail.

The open garden server 20 may support invoice output to support cross-selling between product providers.

In the related art, the retailer downloads a purchaser information Excel spreadsheet from the shopping mall server (market server 40) and uploads the purchaser information to the open garden server 20, and downloads the uploaded purchaser information from the open garden server 20 and uploads the purchaser information to a parcel delivery service company, such that the invoice number is output via a program of the parcel delivery service company. The product provider stores the output invoice number in the original Excel spreadsheet and uploads the Excel spreadsheet to the open garden server 20 and the retailer downloads the Excel spreadsheet, in which the invoice number is stored, from the open garden server 20 again and uploads the Excel spreadsheet to the shopping mall server 40.

However, in the present invention, the above-described processes may be performed in the open garden server 20. That is, the retailer uploads the purchaser information to the open garden server 20, the provider outputs the purchaser information in the open garden server 20 and the retailer uploads the purchaser information including the invoice number to the shopping mall server 40. When the invoice of the present invention is used, complicated processes are simplified to three steps and thus the cross-selling process is simplified, thereby stimulating sale.

In addition, when the invoice is output, the open garden server 20 transmits only some of the purchase information of the consumer, for example, information about color or number to be used for packaging, to the product provider and then transmits the remaining information such as the name, detailed address, telephone number, etc. of the consumer when the product provider requests invoice output, such that all purchase information of the consumer is included in the invoice. By this method, it is possible to prevent delivery of all information of the consumer to the product provider. Accordingly, it is possible to prevent the information about the consumer from being used for nefarious purposes by the product provider.

That is, the open garden server may provide only some information of the purchase information of the consumer such that the product provider prepares product delivery, and output the invoice including all purchase information such as the name, address and telephone number of the purchaser when the product provider requests invoice output.

As described above, the product provider may output the invoice via the terminal thereof. In this case, the open garden server 20 basically provides delivery information to the product provider.

As another method, the open garden server 20 may enable the product provider to output the invoice via the output page of the open garden server 20. In this case, the open garden server may provide a page capable of outputting the invoice.

4. First Product Sales Cost Settlement Process (122 and 126)

When the first product is sold via the retailer as the seller, the open garden server provides the product provider with some profit according to sale.

For example, when a request for purchasing the first product is received from the consumer terminal 50, the retailer transmits the request to purchase to the open garden server 20 and pays for the first product to the open garden server 20. Payment for the product to the open garden server 20 is made simultaneously with purchase (108). After product delivery is confirmed, settlement with the product provider may be made in the open garden server 20.

That is, the substantial purchase cost is deposited into the shopping mall server 40 simultaneously with purchase. When product delivery is confirmed, the shopping mall server 40 provides the retailer with some profit according to purchase (122) and, when completion delivery is confirmed, the open garden server 20 provides the product provider with some profit according to sale of the first product.

Accordingly, profit according to sale of the first product is distributed to the manager of the shopping mall server 40, the retailer, the manager of the open garden server 20 and the product provider.

In this case, the open garden server 20 may monitor whether delivery of the product to the consumer is completed via the delivery information collected from the parcel delivery service company, hold payment cost in escrow and provide some of the purchase cost to the product provider after completion of delivery is confirmed.

5. Second Product Registration and Sale Process 102 to 126

In the above description, when the product provider registers the first product information with the open garden server 20 (102), the retailer sells the first product via the first shopping mall server 40 to create profit (104 to 126).

However, the retailer may also register second product information mapped to a second product produced and provided thereby with the open garden server 20. In this case, the product provider may sell the second product via the second shopping mall server 40 to create profit. In this case, all the above-described processes 102 to 126 are equally applicable. That is, the product provider and the retailer are relative names because the product provider and the retailer sell each other's products.

When the present invention is applied, the product provider for providing the first product and the retailer for providing the second product may register the first product information and the second product information with the open garden server 20, respectively.

In this case, the retailer may sell the first product via the first shopping mall server 40 to create profit and the product provider may sell the second product via the second shopping mall server 40 to create profit.

That is, according to the present invention, the providers for providing different products may sell the products provided by the other providers to create profit while selling the products provided thereby to create profit.

However, the method of the present invention is not necessarily performed only between providers for providing different products.

For example, the retailer may not provide products.

The present invention has been described using the example in which the retailer registers the product information with the first shopping mall server 40 to sell the product. Hereinafter, the present invention will be described using an example in which the product is sold in the retailer terminal 30. In this case, this example is similar to the above description except that the first shopping mall server 40 is equal to the retailer terminal 30. Accordingly, the same description will be given again in order to aid in understanding of the present invention.

That is, the product cross-selling method according to the present invention includes the open garden server receiving and storing product information mapped to products from a plurality of product provider terminals, each of the product provider terminals becoming a retailer terminal for cross-selling the products of the other product providers; the open garden server downloading the product information to the retailer terminal, which has requested the product information, when a request for downloading the product information provided by the other product providers is received from any one of the product provider terminals; the open garden server transmitting a stock condition of the product to the retailer terminal, which has requested the product information; and the retailer terminal providing purchase information of the product to the open garden server and making payment when a consumer requests purchase of product of the original product provider in the retailer terminal and the open garden server, which has received purchase information, transmitting the purchase information to the original product provider terminal to directly deliver the product to the consumer. As described above, each product provider terminal becomes a retailer terminal for cross-selling the products of the other product providers.

When a first product is sold via a retailer for managing the retailer terminal 30 as a seller, the open garden server 20 provides the retailer with some profit according to sale. When a second product is provided by the retailer and is sold via the product provider of the first product as a seller, the open garden server may distribute some profit according to sale to the product provider for providing the first product. That is, the retailer and the product provider are relative to each other. A person who sells the product of another product provider is a retailer and predetermined profit is distributed to the retailer who has sold the product of another product provider.

Distribution of profit to a retailer who has sold the product of another product provider may be performed, by distributing predetermined profit of a product sale price of a product provider or by enabling the retailer to add a predetermined margin to the product sale price of the product provider and to sell the product.

In addition, the product cross-selling method according to the present invention may further include the open garden server enabling the product provider terminal to output the invoice of the product, purchase of which has been requested, and the product provider terminal transmitting the delivery information of the product to the open garden server and the retailer terminal such that the consumer terminal, which has requested purchase of the product, confirms the delivery information in the retailer terminal.

In this case, in the step of confirming the delivery information, the open garden server provides only some purchase information of the consumer to the original product provider and outputs the invoice including all purchase information when the original product provider requests invoice output.

6. Additional Function

First, the open garden server 20 may extract products to be cross-sold with the products registered by the product provider and recommend the products to the product provider.

For example, when the product provider registers a leather jacket, the open garden server 20 may recommend leather gloves as a first recommended product and a scarf as a second recommended product.

The product provider, which has confirmed the recommended products, may cross-sell at least one of the leather gloves and the scarf among the products registered by the other product providers.

Second, the open garden server 20 may provide a method of enabling the product provider to directly search the above-described recommended products.

For example, when the product provider, which has registered the leather jacket, searches for a product best matching the leather jacket in the search window of the open garden server, the open garden server may analyze sale information of the products and recommend the product best matching the leather jacket.

In this case, the open garden server may recommend leather gloves and a scarf.

The product provider, which has confirmed the recommended products, may cross-sell at least one of the leather gloves and the scarf among the products registered by the other product providers.

Third, the open garden server 20 may provide information about the delivery status of the product in real time using a real-time delivery tracking program (Jikimi Shipping) based on the invoice number of the delivered product.

In particular, the open garden server 20 may enable both sellers to confirm the delivery status of the cross-sold products in real time, thereby ensuring delivery reliability of cross selling and further stimulating cross selling.

Fourth, the open garden server 20 may provide past or monthly selling statistics of each product kind. The cross sellers may efficiently select products to be sold, by checking product sales trends. Accordingly, cross selling can be further stimulated.

Fifth, the open garden server 20 may provide information of product sales volume information of each item for a predetermined period and recommend a popular product of the same item to the seller (the retailer or the product provider).

That is, the open garden server 20 may provide information to the seller who decides an item to be sold but does not select a detailed product in the item (category) such that the seller uses the information when selecting a product to be cross-sold.

In this case, the open garden server 20 may provide product sales rankings. That is, the open garden server 20 may provide overall product sales rankings (e.g., top 10, top 20, weekly hit, etc.) such that the seller uses the information when selecting a product to be cross-sold.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A product cross-selling method comprising:
an open garden server receiving and storing product information mapped to products from a plurality of product provider terminals;
each of the plurality of product provider terminals becoming a retailer terminal for cross-selling products of the other product providers and, when a request for downloading product information of a product provided by another product provider is received from any one of the plurality of product provider terminals, the open garden server downloading the product information to a retailer terminal which has requested the product information or a shopping mall server, in which a retailer who is a user of the retailer terminal is registered as a seller;
transmitting a stock change condition of the product according to sale of the product to the retailer terminal or the shopping mall server, which has downloaded the product information, to control the number of the product in stock; and when a consumer requests purchase of the product of the another product provider in the retailer terminal or the shopping mall server, the retailer terminal providing purchase information of the product to the open garden server and, at the same time, making payment and the open garden server, which has received the purchase information, transmitting the purchase information to another product provider terminal such that the product is directly delivered to the consumer by the another product provider.

2. The product cross-selling method according to claim 1, further comprising the open garden server enabling the another product provider terminal to output an invoice for the product, purchase of which has been requested, and transmitting delivery information of the product to the retailer terminal or the shopping mall server such that a consumer terminal, which has requested purchase of the product, confirms the delivery information in the retailer terminal or the shopping mall server.

3. The product cross-selling method according to claim 2, wherein the enabling the another product provider terminal to output the invoice includes the open garden server providing only some of purchase information of the consumer to allow the another product provider to prepare product delivery and outputting the invoice including all purchase information such as a name, address and telephone number of the consumer when the another product provider requests invoice output.

4. The product cross-selling method according to claim 2, further comprising the open garden server tracking delivery in real time based on an invoice number of the delivered product and providing information about the delivery status of the product in real time.

5. The product cross-selling method according to claim 1, further comprising, when product information of a specific product is received from any one of the product provider terminals, analyzing product information transmitted from all of the product provider terminals and a sales record of products mapped to the product information and recommending a product to be cross-sold with the specific product to a product provider of the specific product or enabling the product provider of the specific product to search for the product to be cross-sold.

6. The product cross-selling method according to claim 1, wherein, when the product of the another product provider is sold via a retailer who manages the retailer terminal as a seller, the open garden server distributes, to the retailer, some profit according to sale.

7. The product cross-selling method according to claim 1, further comprising providing sales statistics of products sold by a plurality of product providers to the plurality of product provider terminals and the retailer terminal.

* * * * *